(No Model.) 8 Sheets—Sheet 1.

F. F. RAYMOND, 2d.
HEEL NAILING MACHINE.

No. 412,414. Patented Oct. 8, 1889.

WITNESSES
INVENTOR
Fig. 1

(No Model.)  8 Sheets—Sheet 2.

F. F. RAYMOND, 2d.
HEEL NAILING MACHINE.

No. 412,414.  Patented Oct. 8, 1889.

WITNESSES  INVENTOR (No Model.) F. F. RAYMOND, 2d. 8 Sheets—Sheet 4.
HEEL NAILING MACHINE.
No. 412,414. Patented Oct. 8, 1889.

Fig. 5.

WITNESSES. INVENTOR.

(No Model.)  F. F. RAYMOND, 2d.  8 Sheets—Sheet 5.
HEEL NAILING MACHINE.

No. 412,414.  Patented Oct. 8, 1889.

WITNESSES  Fig.6.  INVENTOR (No Model.)

F. F. RAYMOND, 2d.

HEEL NAILING MACHINE.

No. 412,414. Patented Oct. 8, 1889.

WITNESSES

INVENTOR (No Model.) 8 Sheets—Sheet 7.

F. F. RAYMOND, 2d.
HEEL NAILING MACHINE.

No. 412,414. Patented Oct. 8, 1889.

WITNESSES.
J. H. Dolan
Fred. B. Dolan

INVENTOR.
F. F. Raymond 2d (No Model.)  F. F. RAYMOND, 2d.  8 Sheets—Sheet 8.

HEEL NAILING MACHINE.

No. 412,414.  Patented Oct. 8, 1889.

WITNESSES  
J. W. Dolan  
Fred. B. Dolan

INVENTOR  
F. F. Raymond 2d

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 412,414, dated October 8, 1889.

Application filed April 25, 1887. Serial No. 236,052. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel Nailing and Trimming Machines, of which the following is a full, clear, and exact description, reference being had to the accompanying drawings, forming a part of this specification, in explaining its nature.

The invention comprises a multiple heel-nailing and heel-trimming machine—that is, a machine having two or more sets of heel-nailing devices and two or more sets of heel-trimming devices—adapted to be simultaneously operated upon two or more shoes; and it embraces various features of organization and construction, all of which will hereinafter be described.

Referring to the drawings.

The invention is illustrated as embodied in a machine containing a number of jacks, each of which supports a last or work-support, and a separate nailing organization and heel-trimming apparatus and top-lift-feeding device for each last or work-support. The jacks are mounted upon a common support, which is provided with a vertical movement in relation to the templets for the purpose of compressing the heel-blanks, and the nail-drivers are also provided with vertical movements in relation to their respective templets for the purpose of driving the nails therefrom through the heels into the soles of the boot or shoe. The nail-driving devices are adapted to be simultaneously operated, as are also the various heel-trimming devices, there being a separate heel-trimming mechanism or apparatus for each templet and gang of nail-drivers.

The machine is represented as adapted to attach what is known as "loaded heel-blanks"—that is, heel-blanks which have been pricked and provided with holes and with nails inserted in said holes before they are placed in the attaching-machine.

Figure 5:
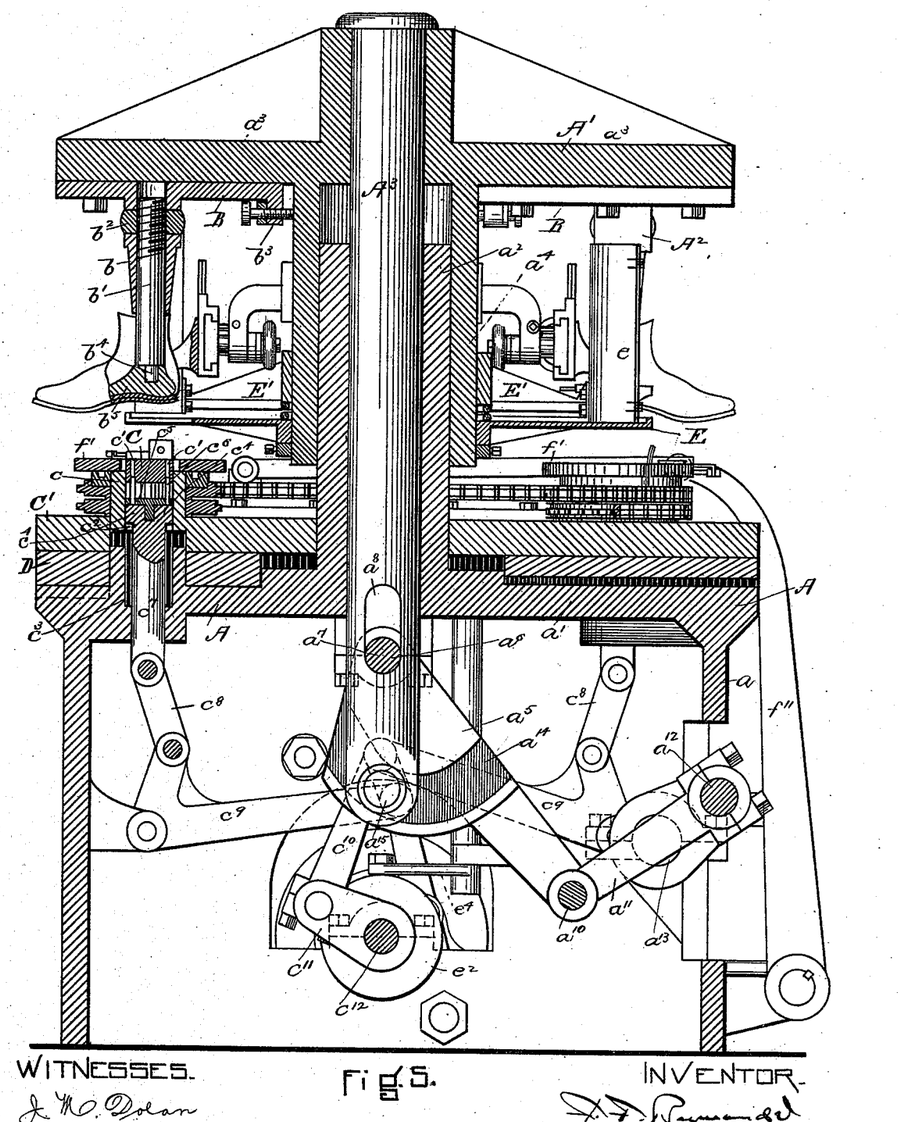
Fig. 5 is a vertical section upon the dotted line $x\,x$ of Fig. 6.
Figure 7:
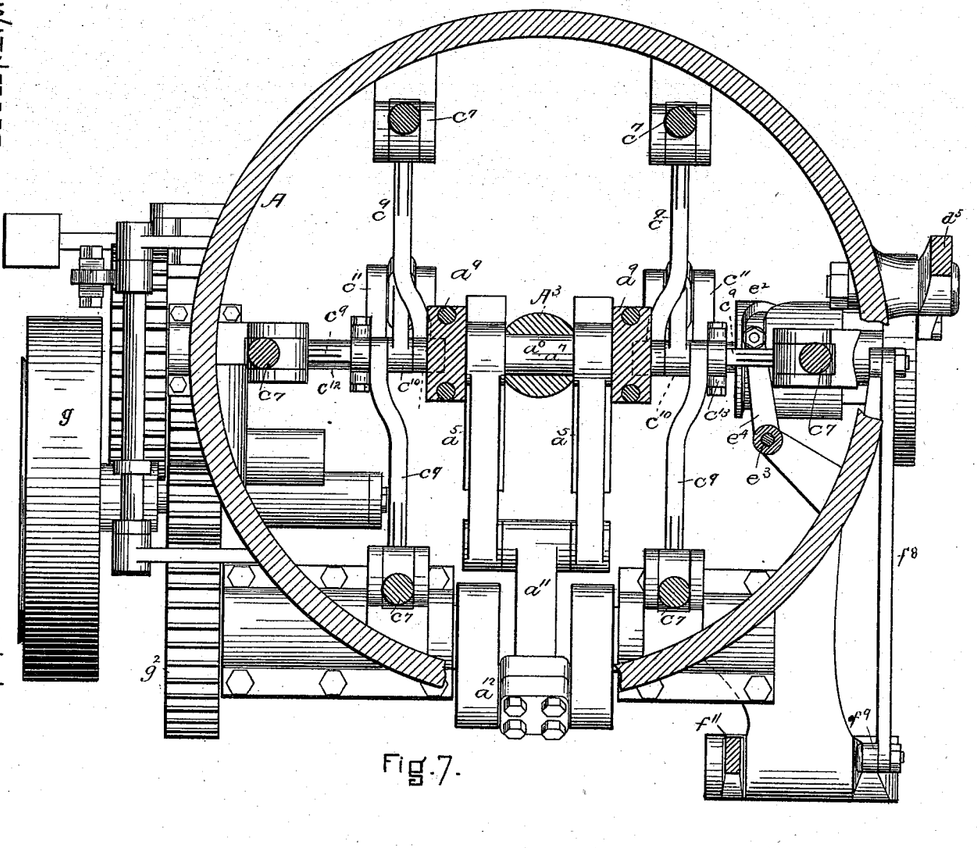
Fig. 7 is a horizontal section upon the line $z\,z$ of Fig. 1.
Figures 8, 9, 10, 11:
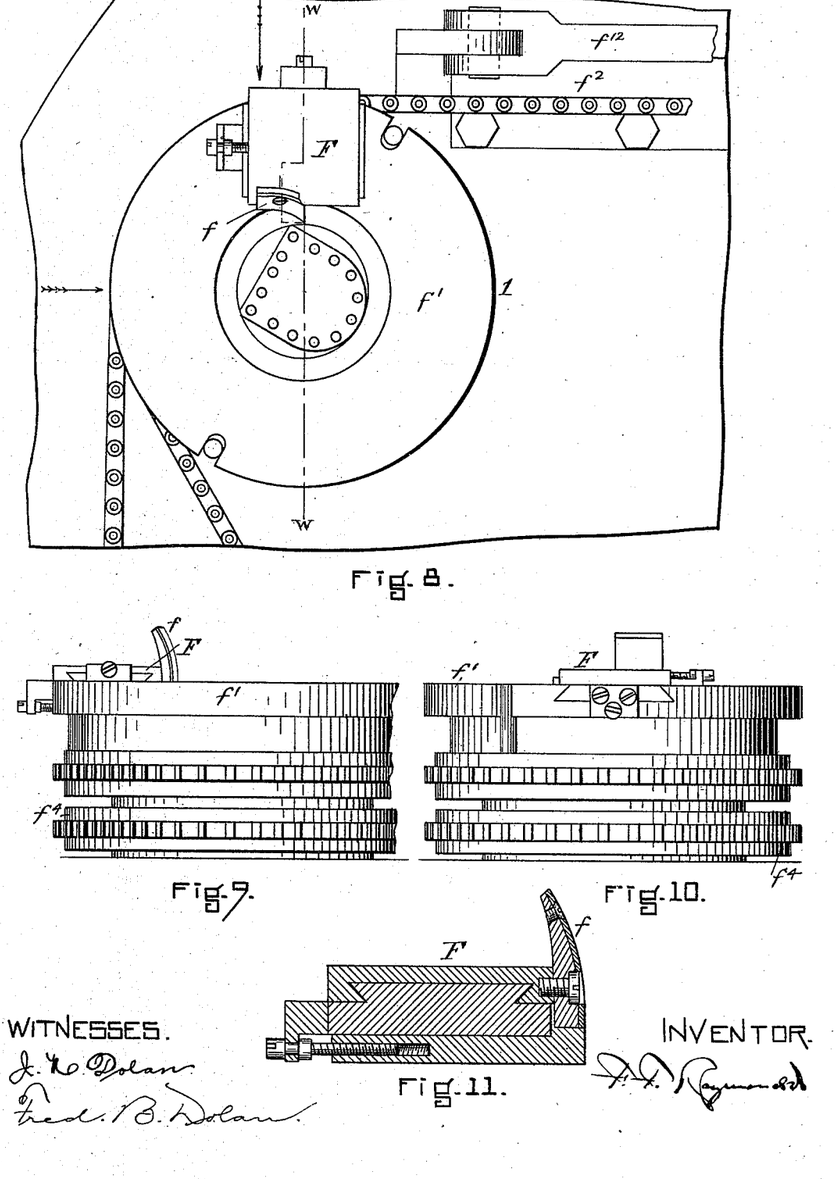
Fig. 8 is an enlarged detail view in plan.
Figs. 9 and 10 are also detail views in elevation, to which reference will hereinafter be made.
Fig. 11 is a vertical section upon the line $w\,w$ of Fig. 8.

Referring to the drawings, A represents the frame of the machine. It is represented as having a cylindrical base $a$, a bed $a'$, and a central column $a^2$. Upon this column there is arranged to slide a head A'. This head has the lateral extensions $a^3$, preferably cylindrical in shape, and upon the under surface of which is arranged a number of guideways, in which the jacks $A^2$ are horizontally movable and by which they are suspended from the under surface of this extension. The head also has the sleeve $a^4$, which surrounds the column $A^2$. The head is directly movable upon the column $a^2$ to depress or lower and raise the jacks $A^2$ simultaneously at desired intervals by a large connecting-rod $A^3$, which extends downward through the hole in the column $a^2$. The cam-levers $a^5$, which are pivoted at $a^6$ by a common pivot $a^7$, extending through the slot $a^8$ in the rod $a^3$ to bearings $a^9$ on each side of the rod, (see Fig. 7,) which levers are connected at their outer ends by a wrist-pin $a^{10}$, (see Figs. 5 and 7,) with the crank $a^{12}$ on the shaft $a^{13}$. One lever $a^5$ is arranged upon one side of the rod $A^3$, between it and the bearing $a^9$, and the other lever upon the other side of the rod $A^3$, between it and the bearing $a^9$. Each of these levers has arranged in it a cam-groove $a^{14}$, (see Fig. 5,) and there enters these cam-grooves a cam-pin $a^{15}$, extending from the side of the lower end of the rod $A^3$, so that the rod has two cam-pins oppositely arranged, one of which enters the cam-groove in the cam-lever upon one side of the rod, and the other of which enters the cam-groove upon the other side. These cam-grooves $a^{14}$ are shaped or constructed to give the jacks first a downward movement to compress the heel-blank upon the soles of the boots or shoes between the lasts or work-supports and the templet, and then an interval of rest. This downward movement and rest is given upon the movement of the cam-levers $a^5$ by the crank in one direction, the reverse direction of the levers of course serving to lift the jacks, and in order to obtain all the movements necessary for attaching the heel-blank top lift, and for trimming it will be necessary to cause the cam-levers $a^5$ to make two oscillations or complete movements and to cause the crank $a^{12}$ to make two complete revolutions. This will give the jacks a second downward movement and period of rest immediately following the last movement, which is utilized for attaching the top lift to the attached heel-blank and for the trimming of the heels. Each jack $A^2$ is provided with a horizontal movement upon the head $A'$, and as many jacks may be used as may be desired.

In the drawings I have represented the machine as having six jacks. For ordinary purposes, however, a machine with two, three, or four jacks would be sufficient.

Figure 1:
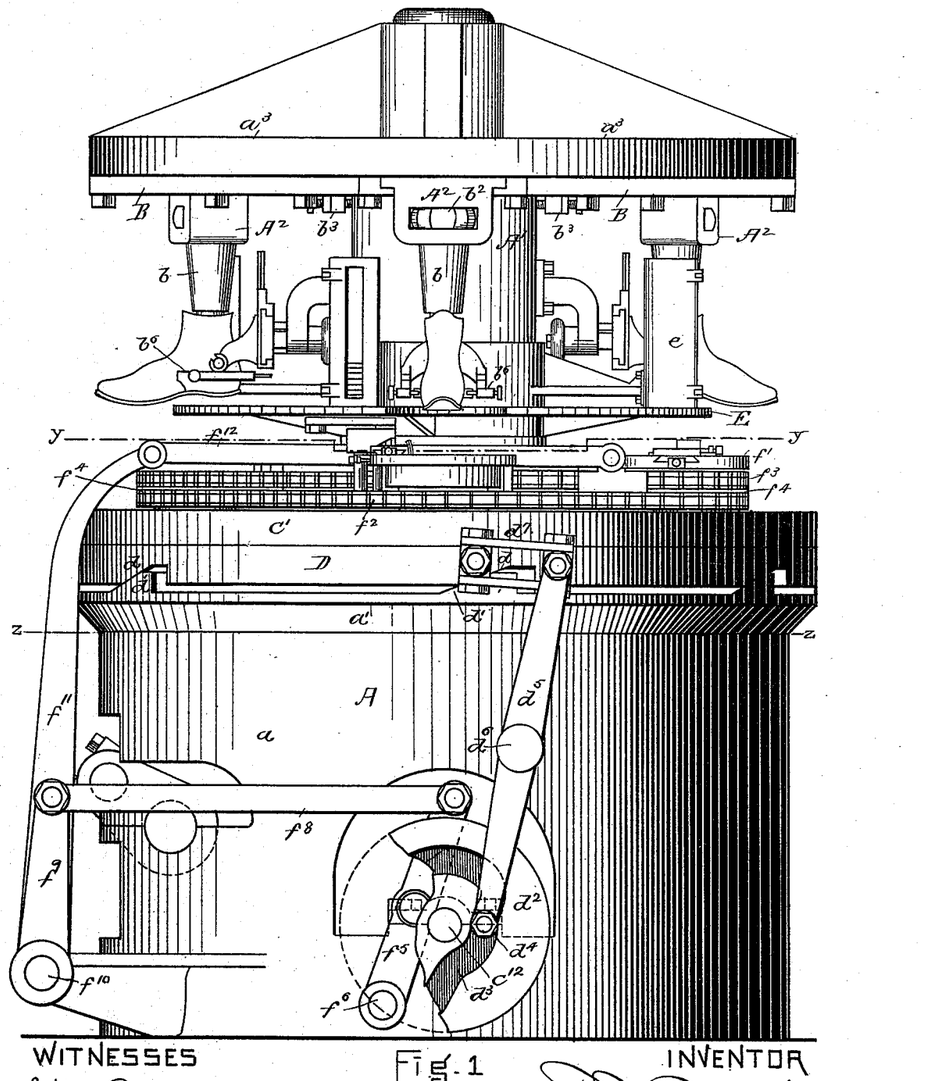
Figure 1 is a view in front elevation of a machine having the features of my invention.
Figure 2:
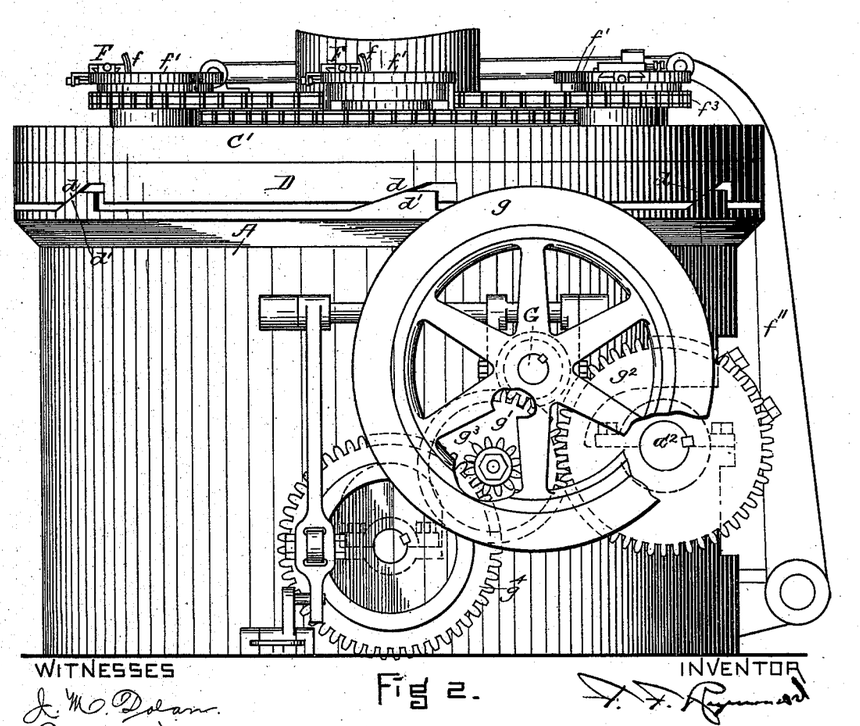
Fig. 2 is a view in side elevation of the central and lower part thereof.
Figure 3:
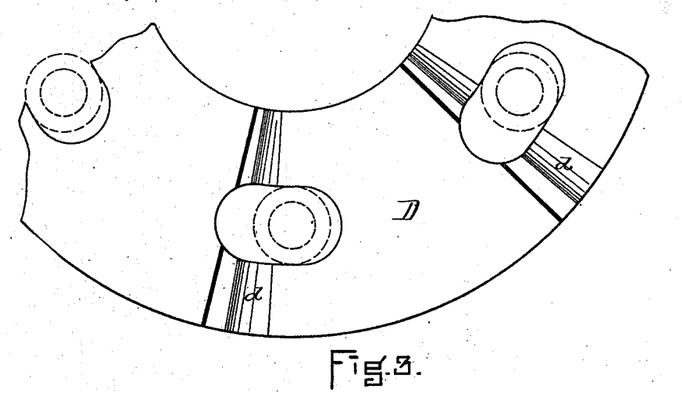
Fig. 3 is a detail view to which reference will be hereinafter made.

Each jack has essentially these elements: First, a slide-plate B, having a post $b$ depending therefrom, in which is a jack-spindle $b'$, and which is vertically adjustable in relation to the post by a nut $b^2$. The slide-plate B has also an adjustable stud $b^3$ for governing its position. The spindle $b'$ has a spindle $b^4$ for holding the last or work-support $b^5$. There is also attached to the sleeve $a^4$ a shoe centering and holding device and guard $b^6$, (see Fig. 1,) which preferably is like that described in Patent No. 103,735, and need not further be described here. Its office is to hold the boot or shoe upon the last or work-support, and also to guard the upper during the action of the trimming-knives. All the templets, nail-driving devices, and heel-trimming devices are alike, and each section or part of this portion of the machine comprises a stationary templet C, mounted upon or in a post $c$, extending upward from the vertically-movable table $C'$. The templet has holes $c'$ of any desired arrangement. The post $c$ extends upward from the table $C'$, and has a hole $c^2$, which is an extension of the hole $c^3$ in the bed A. In this hole there is arranged to be vertically movable a head $c^4$, to which is secured a block $c^5$, carrying a gang or group of drivers $c^6$. The head $c^4$ is formed upon or attached to the upper end of a rod $c^7$. The drivers $c^6$, when the head $c^4$ is in its lowest position, enter the lower parts of the holes $c'$. All the various rods $c^7$ are provided with vertical movements simultaneously by means embracing a toggle $c^8$ and a lever $c^9$. Each of these levers $c^9$ is connected by means of a pitman or connecting-rod $c^{10}$ with a crank $c^{11}$ upon the shaft $c^{12}$. This is the construction where the toggles are connected with a shaft $c^{12}$ by levers extending at right angles to its length.

Figure 4:
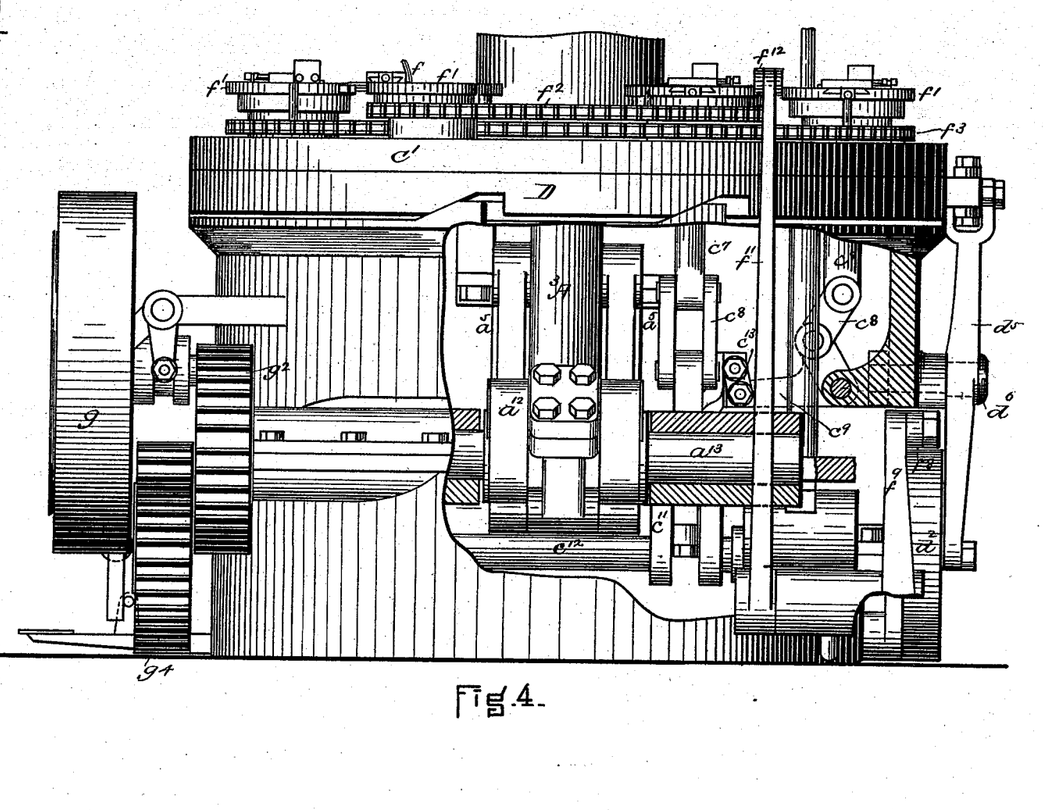
Fig. 4 is a view in elevation, a portion of the frame of the machine being removed to illustrate various features of construction, all of which will be hereinafter specified.
Figure 6:
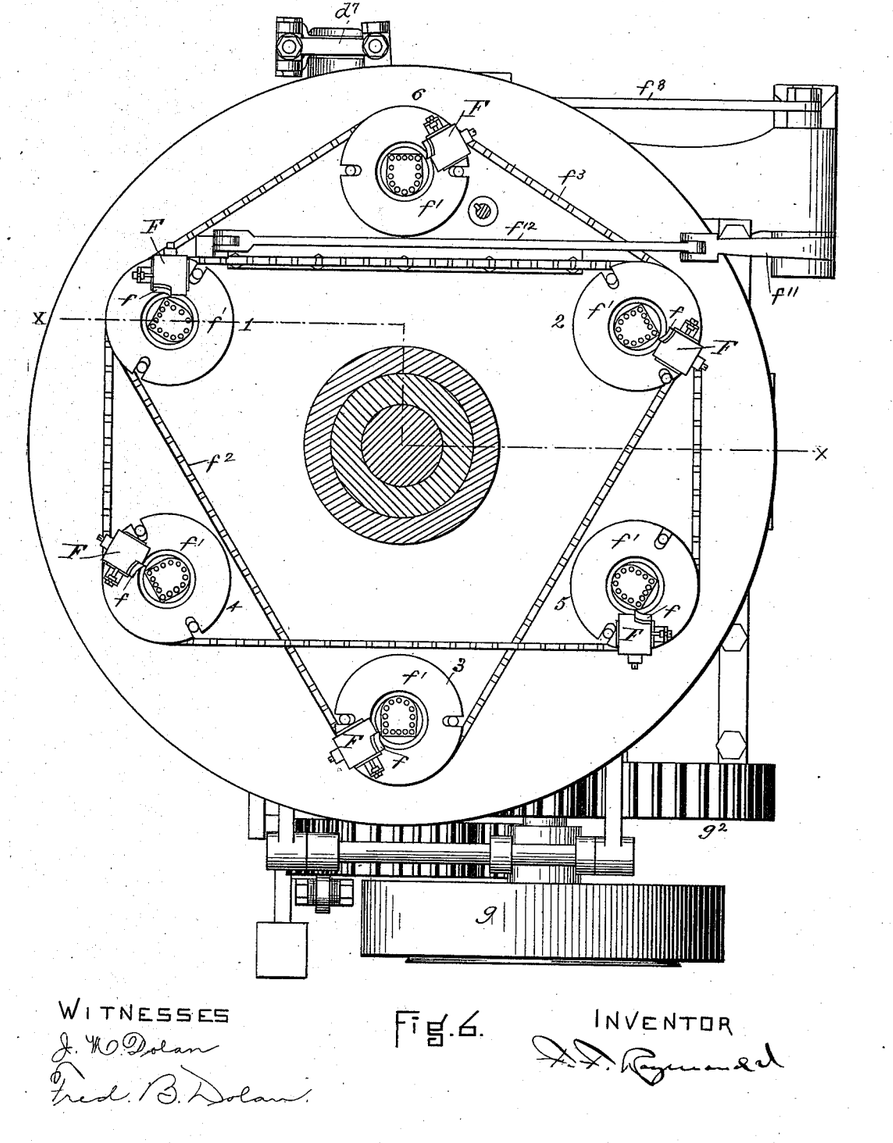
Fig. 6 is a view in horizontal section upon the line $y\,y$ of Fig. 1, and in plan of the parts below said line.

As shown in Figs. 4 and 6, in the organization represented there are also two posts $c^7$, which are in the same line with the shaft $c^{12}$, and these posts are connected with and operated by the shaft, as follows: The lever $c^9$ is connected by means of a link with the wrist-pin or connection between the cross-lever $c^9$ nearest it and the connecting-rod $c^{10}$, so that each end crank $c^{11}$ serves to operate two heads $c^4$, one through the medium of the pitman $c^{10}$ and lever $c^9$, and the other or head that is in line with the shaft by means of the lever $c^9$, which is connected to the pitman by a link $c^{13}$. (See Fig. 4.)

The heads $c^4$, and consequently the gang of drivers carried thereby, are caused to be moved upward to drive the nails immediately upon the completion of the downward movement of the head $A'$ to compress the heel-blanks against the upper surfaces of the templets; and in operation the loaded heel-blanks are placed upon the templets, with their nails entering the holes $c'$, and upon the starting of the machine the downward movement of the lasts or work-supports move the boots or shoes into contact with the heel-blanks and compress them against the templets, and this is immediately followed by the upward movement of the heads $c^4$, which drive the nails from the templets through the heel-blanks into the soles of the boots or shoes, and this is immediately followed by the downward movement of the heads $c^4$, and they remain in their lower position and are not moved upward again during the operation of spanking the top lifts and the trimming of the heels. This is accomplished by giving the shaft $c^{12}$ one complete revolution for every two complete revolutions of the shaft $a^{13}$.

Immediately following the attaching of the heel-blanks the templets C and the other parts carried by the bed $C'$ are lowered sufficiently to permit the introduction of the top-lift-carrying plate with a top lift thereon between each templet and the attached heel-blank. This top-lift-carrying plate may be moved into position by hand and the top lift placed thereon, as described in Patent No. 103,735; or the top lift may be fed automatically into position over the templets.

The table $C'$ is supported upon an annular plate D. (See Figs. 1, 2, 4, and 5.) This annular plate D is adapted to be operated or moved a limited distance upon the bed A, and it has a series of inclines $d$, which rest upon inclined surfaces $d'$ upon the bed A, so that upon the rotary movement being imparted to the annular ring in one direction it is caused to be lifted by the rotating of the incline $d$ upward upon the incline $d'$, while upon the rotation in the opposite direction it is caused to be lowered, and this will of course cause the table $C'$ and all that it supports to be lifted and lowered. These movements are imparted to the ring D by means of a cam $d^2$ upon the shaft $c^{12}$, which cam has a groove $d^3$ receiving a cam-pin $d^4$ on the lower end of the lever $d^5$. This lever is pivoted at $d^6$, and is connected at its upper end by a link $d^7$ with the annular plate D. (See Fig. 1.) The cam-groove $d^3$ is so timed or constructed as to move the plate D to cause it to lower the table C' immediately after the attaching-nails have been driven and before the top lifts have been spanked, and to return the same at the completion of the trimming of the heels.

The apparatus for feeding top lifts automatically embraces the annular plate E, mounted upon the sleeve $a^4$ of the head A' in a manner to be vertically adjustable thereon and below the box or receptacle $e$ for each jack, which holds top lifts in stack. The plate also is cut away at $e'$, to form a recess, in which the heel-trimming mechanism may be moved about the heel-blank. When this plate is used, it will be necessary to give the head A' three reciprocations, instead of two, as above specified—that is, there must be, first, the movement for compressing the heel-blank; second, the movement for attaching the top lifts, and the third movement for the operation of the heel-trimming devices, and the shaft $c^{12}$ will then have one revolution for every three of the shaft $a^{13}$. This top-lift plate is moved or turned at proper intervals of time to feed or move the top lifts from the box or receptacles $e$ to a position beneath the heel-blanks, and is then moved downward with the head A' to the templets, and the sections thereof upon which the top lifts rest cover the templets, forming a flat spanking-surface, which supports the top lifts while they are being spanked upon the heels by the continued downward movement of the jacks. To enable this relative movement of the jacks in relation to the top-lift plates to take place, it is necessary that the plate should have a slight yielding movement upon the sleeve $a^4$ of the head A', and this is obtained by mounting a spring upon the post over the plate. (See Fig. 5.)

Figure 12:
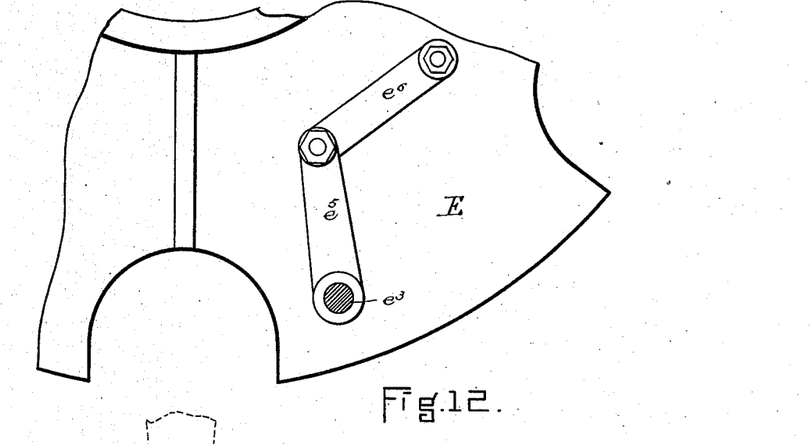
Figs. 12 and 13 represent enlarged detail views of the top-lift-feeding mechanism, which will be described hereinafter.
Figure 13:
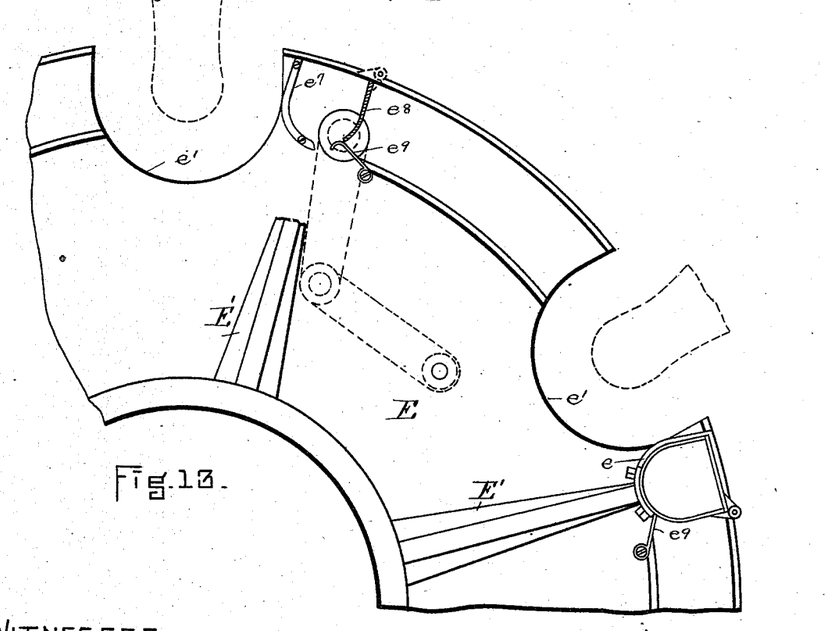

The top-lift boxes $e$ are supported by the arms E', extending radially from the sleeve $a^4$, and they rise and fall with the plate E. The plate E is provided with a movement sufficient to carry the top lifts from the receptacles into position over the templets by means of the cylinder-cam $e^2$ upon the shaft $c^{12}$, the rock-shaft $e^3$, which has an arm or lever $e^4$, provided with a cam-pin, which enters the cam-groove of the cylinder-cam, and which has at its upper end the arm $e^5$, (see Fig. 12,) which is connected with the top-lift carrier-plate E by means of a link $e^6$. The top-lift carrier-plate has the gages $e^7$, which are brought in contact with the top lift upon the movement of the plate E to the boxes, and upon the movement of the plate from the receptacles or boxes to deliver the top lifts over the templets the lifts rest upon the plate against a gage, while the hinged arms $e^8$ and spring $e^9$ operate to hold the top lifts in the box, or, in other words, prevent their dropping upon the upper surface of the top-lift carrier-plate, and upon the reverse movement of the carrier-plate these arms are caused to be moved sufficiently to permit the top lifts to drop and come into position opposite their respective gages.

There is a trimming device or mechanism adapted to be operated in connection with each templet and jack, and I have represented the form of trimming mechanism used upon the McKay and Bigelow heeling-machine, described in Patents No. 103,735 and No. 203,440. It comprises a block F, carrying a knife $f$, which is caused by means of a sprocket-wheel $f'$ to be moved about the heel-blank from one breast edge around the back to the other, and the movement of the block F is controlled by a cam in a stationary block under the movable block $f'$. Each movable block $f'$ has a bearing upon the post $c$, and the various sprocket-wheels are connected with each other by means of chains $f^2$ $f^3$. The three trimming mechanisms, Nos. 1, 2, and 3, (see Fig. 6,) are connected by the chain $f^2$, and the mechanisms 1, 2, 4, and 5 each have an additional sprocket-wheel $f^4$ for the chain $f^3$, which also runs to the trimming device 6. These chains cause these sprocket-wheels to be turned or operated, so that the trimming devices are simultaneously moved or turned, and I have represented the chain as moved at the desired interval of time by means of the lever $f^5$, pivoted at $f^6$, moved or operated by a cam. This lever $f^5$ is connected by means of a rod $f^8$ to a lever $f^9$, extending to a short shaft $f^{10}$, which also carries a long lever $f^{11}$, and this long lever is connected with the chain by means of a long rod $f^{12}$, (see Figs. 1, 4, and 6,) and the trimming devices are caused to be operated, in case the top lifts are automatically fed into position and attached, at the end of the third downward movement of the head A'; in case the top lifts are fed by hand, at the second downward movement of the head A', and the trimming then takes place; but, as illustrated in the present machine, the top lifts are not fed until after the second movement of the head A'.

G is the main shaft of the machine. $g$ is a combined fly-wheel and pulley thereon. The shaft G is connected by means of the intermediate gear $g'$ with the gear $g^2$ upon the shaft $a^{12}$.

In operation the loaded heel-blanks are placed upon the templets with their nails extending into the templet-holes. The boots or shoes are mounted on the lasts or work-supports, and the jacks pushed into operative position. The machine is then set in operation, and if the top lifts are automatically supplied or fed the operation of the machine is continuous until the completion of the work—that is, two or more heel-blanks are simultaneously compressed and attached to two or more boots or shoes and top lifts therefor fed into position and automatically attached and the heels then simultaneously trimmed. If the top lifts are fed by hand, the machine comes to rest after the attaching of the heel-blanks, and the top lifts are then placed on the templet-covering plates and the machine again set in operation and the top lifts spanked on the heels.

The advantages of the invention arise from the rapidity with which heels are attached and trimmed.

Having thus fully described my invention, I claim and desire to secure by Letters Patent of the United States—

1. In a heel nailing and trimming machine, the combination of two or more jacks having a horizontal and vertical adjustment and each of which supports or carries a work-support, said lasts or work-supports, two or more nail-driving devices, a heel-trimming apparatus adapted for use with each heel-nailing device, the main shaft of the machine, and intermediate connecting mechanism, substantially as specified, whereby the nail-driving devices are first simultaneously operated to attach two or more heels to as many shoes and the heel-trimming devices then simultaneously operated to trim said attached heels, as and for the purposes set forth.

2. In a heel nailing and trimming machine, the combination of two or more horizontally-adjustable jacks, each of which supports a last or work-support, the last or work-supports, two or more gangs of nail-drivers, a carrier having devices, substantially as described, for applying the top lift to the attached heels, as set forth, and a heel-trimming apparatus, as set forth, for each gang of drivers, as and for the purposes specified.

3. In a heel nailing and trimming machine, the combination of two or more jacks having a horizontal and vertical adjustment, the lasts or work-supports carried by said jacks, a carrier provided with two or more devices for automatically delivering the top lifts from a stack to position for adjustment to the heels of the boot or shoe, two or more heel-trimming devices, and the mechanism, as set forth, intimately connecting and simultaneously operating the devices in the order named, as and for the purposes specified.

4. In a heel nailing and trimming machine, the head A, carrying two or more jacks A', in combination with rod $A^3$, the cam-lever $a^5$, having the cam-groove $a^{14}$, the cam-pin $a^{15}$, the crank $a^{13}$, and connecting-rod $a^{11}$, substantially as described.

5. In a heel-nailing machine, two or more templets C, mounted upon a common bed or table C', and a cam-actuated lever for lifting and lowering said table or bed, as and for the purposes specified.

6. The combination of two or more templets C, mounted upon a table or bed C', the movable plate D, having the inclined surfaces $d$, and the bed A, having the inclined surfaces $d'$, as and for the purposes specified.

7. The combination of two or more templets C, mounted upon a common bed C', a lifting plate or device D, and a cam connected with said plate or lifting device for operating the same at any predetermined interval to cause it to lower and lift the table C', as and for the purposes described.

8. The combination, in a heel-nailing machine, of two or more templets C, mounted upon a common table C', a head $c^4$, supporting a gang or group of drivers $c^6$ for each templet, and a shaft $c^{12}$, connected with each head by means of a crank $c^{11}$, link $c^{10}$, lever $c^9$, and toggles $c^8$, as and for the purposes described.

9. The combination of a top-lift carrier-plate E, adapted to present simultaneously a number of top lifts to as many attached heel-blanks, with a cam $e^2$ and connecting mechanism, substantially as described, for moving the plate at a predetermined time, as and for the purposes specified.

10. The combination of the head A', two or more jacks suspended therefrom, each of which carries a last or work-support, and devices for moving the head and jacks vertically in relation to the templets C, said templets C mounted upon a bed C', and means, substantially as described, for changing the level of the said templets, and a reciprocating head for each templet carrying a gang or group of drivers, and operative mechanism, substantially as specified, whereby the head A and jacks are first moved downward to compress two or more heel-blanks to the soles of the boot or shoe, the heads supporting the nail-drivers simultaneously moved upward to drive the attaching-nails, the jacks then lifted and the templets lowered to permit the insertion or placing of the top lifts and their holding-plates, and the head A' again moved downward to cause the top lifts to be spanked to the attached heel-blanks, as and for the purposes described.

11. The combination, in a heel-nailing machine, of a jack $A^2$, a last or work-support $a^3$, the head A', carrying the jack, a cam $a^{14}$, controlling the vertical movements of the said head, a templet C, and devices for lowering and raising the same, a head carrying a gang or group of drivers operated by a toggle $c^8$, lever $c^9$, crank $c^{11}$, and link $c^{10}$, connecting the crank with the lever, the shaft $c^{12}$, carrying said crank $c^{11}$, and the shaft $a^{13}$, operating the cam $a^{14}$, whereby the head A' is caused to make two or three full vertical movements for each complete vertical movement of the head $c^4$, as and for the purposes described.

12. The combination, in a heel nailing and trimming machine, of the head A', adapted, by mechanism substantially as described, to have two or more vertical movements imparted to it, and a period of rest at the end of the downward vertical movement, two or more templets C, the heads $c^4$, each of which carries a gang or group of drivers adapted to have upward vertical movements imparted to them immediately upon the completion of the first downward movement of the head A', means, substantially as described, for varying the height of the templets C after the driving of the attaching-nails and before the spanking of the top lifts to the attached heel, a separate trimming mechanism for each nail-driving device, adapted to be operated upon the end of a second or third downward movement of the head A' and while it remains stationary, as and for the purposes described.

13. In a heel nailing and trimming machine, two or more jacks having a vertical and horizontal adjustment, each of which supports a last or work-support, two or more nail-driving devices, two or more heel-trimming devices, a common prime motor intimately connected, respectively, with said jacks, nail-driving devices, and heel-trimming devices, whereby they are caused to be operated simultaneously, substantially as set forth.

FREEBORN F. RAYMOND, 2D.

Witnesses:
J. M. DOLAN,
FRED. B. DOLAN.